(12) United States Patent
Funk et al.

(10) Patent No.: US 8,477,946 B2
(45) Date of Patent: Jul. 2, 2013

(54) METHOD AND APPARATUS FOR PROTECTING ENCRYPTION KEYS IN A LOGICALLY PARTITIONED COMPUTER SYSTEM ENVIRONMENT

(75) Inventors: Mark R. Funk, Mantorville, MN (US); Jeffrey E. Remfert, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1193 days.

(21) Appl. No.: 12/038,038

(22) Filed: Feb. 27, 2008

(65) Prior Publication Data

US 2009/0214040 A1    Aug. 27, 2009

(51) Int. Cl.
  *H04L 9/00*    (2006.01)
  *G06F 13/00*    (2006.01)
(52) U.S. Cl.
  USPC ............... 380/277; 380/281; 726/26; 726/27; 711/163; 711/170; 711/173; 711/202; 711/203
(58) Field of Classification Search
  USPC ............... 380/277, 281; 726/16, 26; 711/147, 711/148, 149, 203
  See application file for complete search history.

(56) References Cited

U.S. PATENT DOCUMENTS

| | | | | | |
|---|---|---|---|---|---|
| 5,890,199 | A | * | 3/1999 | Downs | 711/106 |
| 5,995,623 | A | * | 11/1999 | Kawano et al. | 713/189 |
| 6,895,491 | B2 | * | 5/2005 | Kjos et al. | 711/203 |
| 6,959,090 | B1 | * | 10/2005 | Alve et al. | 380/277 |
| 7,107,459 | B2 | * | 9/2006 | Caronni et al. | 713/190 |
| 7,171,566 | B2 | * | 1/2007 | Durrant | 713/189 |
| 7,219,369 | B2 | * | 5/2007 | Hashimoto et al. | 726/21 |
| 7,810,133 | B2 | * | 10/2010 | Carter et al. | 726/2 |
| 7,970,133 | B2 | * | 6/2011 | Davidson | 380/44 |
| 2002/0108025 | A1 | * | 8/2002 | Shaylor | 711/203 |
| 2007/0050642 | A1 | * | 3/2007 | Flynn et al. | 713/192 |
| 2007/0180515 | A1 | * | 8/2007 | Danilak | 726/16 |
| 2009/0037668 | A1 | * | 2/2009 | Giles et al. | 711/148 |

OTHER PUBLICATIONS

Peter James, "Securing Data at Rest," Secure Systems Ltd, http://www.securesystems.com.au/pages/04_news/whitepaper_pdf/Securing%20Data%20At%20Rest.pdf, copyright 2004.

* cited by examiner

*Primary Examiner* — Linglan Edwards
(74) *Attorney, Agent, or Firm* — Roy W. Truelson (57) ABSTRACT

In a logically partitioned computer system, a partition manager maintains and controls master encryption keys for the different partitions. Preferably, processes executing within a partition have no direct access to real memory, addresses in the partition's memory space being mapped to real memory by the partition manager. The partition manager maintains master keys at real memory addresses inaccessible to processes executing in the partitions. Preferably, a special hardware register stores a pointer to the current key, and is read only by a hardware crypto-engine to encrypt/decrypt data. The crypto-engine returns the encrypted/decrypted data, but does not output the key itself or its location.

17 Claims, 6 Drawing Sheets

METHOD AND APPARATUS FOR PROTECTING ENCRYPTION KEYS IN A LOGICALLY PARTITIONED COMPUTER SYSTEM ENVIRONMENT

FIELD OF THE INVENTION

The present invention relates to digital data processing, and in particular to methods and apparatus for protecting encryption keys stored in a digital data system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which form a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software with enhanced function, along with faster hardware.

Almost all modern general purpose computer systems support some form of sharing of information with other computer systems, as via the Internet or some other network, and almost all large systems support multi-tasking on behalf of multiple users, in which multiple processes are simultaneously active, and computer system resources, such as processor and memory resources, are allocated among the different processes. Often, the actual users are physically remote from the computer system itself, communicating with it across a network. In the case of the Internet, the actual users may communicate with the computer through multiple intermediate computer systems and routers, and be so remote that they are difficult to identify.

Making the capabilities of computer systems widely available provides great benefits, but there are also risks which must be addressed. In such an environment of multiple users, some of them remote, sharing resources on a computer system, and communicating with other computer systems which may similarly share resources, data security and integrity are a significant concern.

If the capabilities of a system are to be made widely available, it is impractical to vet all persons using the system's capabilities. It must be assumed that it will be possible for unscrupulous persons to use the system, and the system should therefore be designed so that those who use it can not compromise its data integrity or access unauthorized data. Widely available systems therefore have various protection mechanisms, whereby the operations a user can perform are limited, data is isolated, and users are protected from one another. However, it is generally necessary to allow some individual or relatively small group of individuals greater access to the system for purposes of performing maintenance operations, administering system access by others, and so forth. Special access mechanisms exist for this purpose. Thus, an entire hierarchy of access mechanisms may exist for accessing different capabilities of a system by different classes of users.

In theory, these various access mechanisms for different users and associated security and protection measures protect the system and its data. However, these mechanisms are enormously complex. It is difficult to design systems of such complexity which are foolproof. Human ingenuity being what it is, unscrupulous persons all too often find ways to defeat the protection mechanisms. Those skilled in the art of computer security and data integrity therefore seek new and improved mechanisms for system protection. As these new and improved mechanisms are developed, interlopers likewise seek ways to thwart the improved protection mechanisms. Thus, an arms race of sorts exists between those who seek to protect computer systems and those who seek to defeat that protection, requiring continuing improvements to computer system protection mechanisms. Often, it is the anticipation of the security exposure which requires the greatest skill on the part of those who protect computer systems; the fix may be relatively straightforward once the exposure is understood and appreciated. It can not be expected that any single new development will, once and for all, put an end to attempts to defeat computer system protection mechanisms, but any development which makes it more difficult for the interloper has potential value.

One form of protection mechanism is the encryption of data stored in a digital data system or transmitted from one system to another over a network. Encryption is often accomplished with any of various techniques. Examples of encryption algorithms include symmetric algorithms which use a common key for encryption and decryption, such as the Advanced Encryption Standard (AES) algorithm or the Triple Data Encryption Standard (TDES) algorithm; and various public/private key encryption algorithms, which use a pair of keys, one for encryption and one for decryption. In general, encryption transforms data into an unintelligible form, from which it can be restored to its original form by decrypting with a key, which is itself data. Since the encryption/decryption algorithm itself is typically known, anyone possessing the key can restore the encrypted data to its original form.

It is theoretically possible to encrypt all sensitive data stored in a computer system and thus protect it from being viewed and understood by interlopers, even if the data can be accessed. But this merely raises another problem. For the data, to be of any use, must be capable of decryption, meaning that the applicable key must be stored somewhere. Anyone who could access the key could decrypt the data. It is possible to encrypt the key as well, using another key. But at some level, there must exist at least one key which is stored in unencrypted form, from which data can be restored. This key or keys, referred to herein as a "master key", should be protected to a high degree, and stored in such a manner as to be inaccessible to potential interlopers.

A recent development in the management of complex computer system resources is the logical partitioning of system resources. Conceptually, logical partitioning means that multiple discrete partitions are established, and the system resources of certain types are assigned to respective partitions. For example, processor resources of a multi-processor system may be partitioned by assigning different processors to different partitions, by sharing processors among some partitions and not others, by specifying the amount of processing resource measure available to each partition which is sharing a set of processors, and so forth. Tasks executing within a logical partition can use only the resources assigned to that partition, and not resources assigned to other partitions. Memory resources may be partitioned by defining memory address ranges for each respective logical partition, these address ranges not necessarily coinciding with physical memory devices.

A logical partition virtualizes a complete computer system. Within any logical partition, the partition appears to be a complete computer system to tasks executing at a high level. Each logical partition has its own operating system (which might be its own copy of the same operating system, or might be a different operating system from that of other partitions). The operating system appears to dispatch tasks, manage memory paging, and perform typical operating system tasks, but in reality is confined to the resources of the logical partition. Thus, the external behavior of the logical partition (as far as the task is concerned) should be the same as a complete computer system, and should produce the same results when executing the task.

Logical partitions are generally regulated by a partition manager, which is specially privileged low-level software, although some hardware support such as special registers and recognition of a partition manager privilege may also be required. The partition manager maintains certain global state data regarding system resource allocations, as well as other state data necessary to enforce logical partitioning of the resources. Naturally, user access to the partition manager is normally restricted to a highly trusted user, such as a system administrator or user with similar authority.

Because a logical partition virtualizes an independent computer system, multiple partitions executing on the same computer system hardware are isolated from one another. State data of one partition is not directly accessible to a task executing in another partition. Among other things, this provides some degree of protection for tasks executing in one partition, against a rogue task in another partition.

Isolation of logical partitions typically means that, if encryption is used, each partition has its own master encryption key or keys, which is used only by it. Each partition typically has its own mechanism for protecting the master encryption key Although various conventional mechanisms exist for storing master encryption keys, the arms race continues, and it must be assumed that interlopers will attempt to circumvent these mechanisms and obtain access to encryption keys. Continued secure and correct operation of computer systems requires constant vigilance, and in particular, requires that potential avenues of attack be anticipated in advance, and appropriate countermeasures taken. Anticipating such potential avenues of attack is a difficult and demanding art.

SUMMARY OF THE INVENTION

In a logically partitioned computer system in which partitioning is enforced by a partition manager, each partition has no access to its master encryption key. Use of the key is through the partition manager.

In the preferred embodiment, processes executing within a partition have no direct access to real memory. Addresses in the memory space of a partition are mapped to real memory by the partition manager. The partition manager maintains a table of master keys for the various partitions. The partition manager as well as the table of keys reside at real addresses which do not correspond to addresses in the address space of the partitions, and are therefore inaccessible to the processes executing in the partitions.

In the preferred embodiment, in order to avoid a call to the partition manager whenever in is necessary to use a key, a special-purpose key address hardware register in the processor contains a pointer to the master key of the currently active partition, the pointer specifically being a real address of the master key. The partition manager reloads this register via a single hardware level privileged instruction whenever there is a context change causing a different partition to be using the processor. The key address register is not readable except for use by a hardware crypto-engine which encrypts/decrypts data, and is not writable except by the partition manager. To encrypt/decrypt data, an instruction invoking the hardware crypto-engine is issued, causing the key address register to be read, and the master key to be fetched from the location pointed to by the key address register to encrypt/decrypt the data. The crypto-engine returns the encrypted/decrypted data, but does not output the key itself or its location.

By maintaining key access in the partition manager in accordance with the preferred embodiment of the present invention, an additional layer of protection is provided for master encryption keys. The operating system kernel of each partition itself has no access to the master key, and therefore even a security breach of the operating system kernel will not expose the master encryption key. In the preferred embodiment, neither the operating system kernel nor any application executing within a partition is aware of the real address space, and can not access an arbitrary real address (even assuming it knows the real address location of a key). Since the operating system kernel is typically substantially more complex than the partition manager, and a computer system may be configured to have multiple different operating system kernels or levels of operating system kernels in different partitions, it is substantially more difficult to assure security of all the operating system kernels than it is to assure security of the partition manager. Thus a potential security exposure is anticipated in advance and reduced.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Logical Partitioning Overview

Logical partitioning is a technique for dividing a single large computer system into multiple partitions, each of which behaves in most respects as a separate computer system. Computer system resources may be allocated into discrete sets, such that there is no sharing of a single resource among different partitions; or may be shared on a time interleaved or other basis; or some resources may be allocated into discrete sets while others are shared. Examples of resources which may be partitioned are central processors, main memory, I/O processors and adapters, and I/O devices. Each user task executing in a logically partitioned computer system is assigned to one of the logical partitions ("executes in the partition"), meaning that it can use only the system resources or share of resources assigned to that partition, and not resources assigned to other partitions.

Logical partitioning is indeed logical rather than physical. A general purpose computer typically has physical data connections such as buses running among different hardware components, allowing them to communicate with one another. These hardware resources may be shared by and/or allocated to different partitions. From a physical configuration standpoint, there is typically no distinction made with regard to logical partitions. Generally, logical partitioning is enforced by a partition manager embodied as low-level encoded executable instructions and data, although there may be a certain amount of hardware support for logical partitioning, such as special hardware registers which hold state information. The system's physical devices and subcomponents thereof are typically physically connected to allow communication without regard to logical partitions, and from this hardware standpoint, there is nothing which prevents a task executing in partition A from writing to memory or an I/O device in partition B. The low level code function and/or hardware prevent access to the resources in other partitions.

Code enforcement of logical partitioning constraints generally means that it is possible to alter the logical configuration of a logically partitioned computer system, i.e., to change the number of logical partitions or re-assign resources to different partitions, without reconfiguring hardware. Generally, some portion of the logical partition manager comprises an interface with low-level code function that enforces logical partitioning. This logical partition manager interface is intended for use by a single or a small group of authorized users, who are herein designated the system administrator. In the preferred embodiment described herein, the partition manager is referred to as a "hypervisor".

Logical partitioning of a large computer system has several potential advantages. As noted above, it is flexible in that reconfiguration and re-allocation of resources is easily accomplished without changing hardware. It isolates tasks or groups of tasks, helping to prevent any one task or group of tasks from monopolizing system resources. It facilitates the regulation of resources provided to particular users; this is important where the computer system is owned by a service provider which provides computer service to different users on a fee-per-resource-used basis. It may enable a single computer system to concurrently support multiple operating systems and/or environments, since each logical partition can be executing a different operating system or environment. Finally, isolation of tasks and resources makes it more difficult for a process executing in one partition to access resources in another partition, thus providing greater security.

Additional background information regarding logical partitioning can be found in the following commonly owned patents and patent applications, which are herein incorporated by reference: Ser. No. 11/191,402, filed Jul. 28, 2005, entitled Method and Apparatus for Maintaining Cached State Date for One or More Shared Devices in a Logically Partitioned Computer System; Ser. No. 10/977,800, filed Oct. 29, 2004, entitled System for Managing Logical Partition Preemption; Ser. No. 10/857,744, filed May 28, 2004, entitled System for Correct Distribution of Hypervisor Work; Ser. No. 10/624,808, filed Jul. 22, 2003, entitled Apparatus and Method for Autonomically Suspending and Resuming Logical Partitions when I/O Reconfiguration is Required; Ser. No. 10/624,352, filed Jul. 22, 2003, entitled Apparatus and Method for Autonomically Detecting Resources in a Logically Partitioned Computer System; U.S. Pat. No. 7,076,570 to Ahrens et al., entitled Method and Apparatus for Managing Service Indicator Lights in a Logically Partitioned Computer System; U.S. Pat. No. 7,028,157 to Block et al., entitled On-Demand Allocation of Data Structures to Partitions; U.S. Pat. No. 7,139,855 to Armstrong et al., entitled High Performance Synchronization of Resource Allocation in a Logically-Partitioned Computer System; Ser. No. 10/422,425, filed Apr. 24, 2003, entitled Selective Generation of an Asynchronous Notification for a Partition Management Operation in a Logically-Partitioned Computer; U.S. Pat. No. 7,076,634 to Lambeth et al., entitled Address Translation Manager and Method for a Logically Partitioned Computer System; Ser. No. 10/422,190, filed Apr. 24, 2003, entitled Grouping Resource Allocation Commands in a Logically-Partitioned System; U.S. Pat. No. 7,133,994 to Abbey, entitled Configuration Size Determination in a Logically Partitioned Environment; U.S. Pat. No. 7,155,629 to Lange-Pearson et al., entitled Virtual Real Time Clock Maintenance in a Logically Partitioned Computer System; U.S. Pat. No. 6,957,435 to Armstrong et al., entitled Method and Apparatus for Allocating Processor Resources in a Logically Partitioned Computer System; U.S. Pat. No. 6,766,398 to Holm et al., entitled A Method for Processing PCI Interrupt Signals in a Logically Partitioned Guest Operating System; U.S. Pat. No. 6,820,164 to Holm et al., entitled A Method for PCI Bus Detection in a Logically Partitioned System; U.S. Pat. No. 6,662,242 to Holm et al., entitled Method for PCI I/O Using PCI Device Memory Mapping in a Logically Partitioned System; U.S. Pat. No. 6,912,493 to Scheel et al., entitled Technique for Configuring Processors in System With Logical Partitions; U.S. Pat. No. 6,438,671 to Doing et al., entitled Generating Partition Corresponding Real Address in Partitioned Mode Supporting System; U.S. Pat. No. 6,467,007 to Armstrong et al., entitled Processor Reset Generated Via Memory Access Interrupt; U.S. Pat. No. 6,681,240 to Armstrong et al, entitled Apparatus and Method for Specifying Maximum Interactive Performance in a Logical Partition of a Computer; U.S. Pat. No. 6,959,291 to Armstrong et al, entitled Management of a Concurrent Use License in a Logically Partitioned Computer;

U.S. Pat. No. 6,691,146 to Armstrong et al., entitled Logical Partition Manager and Method; U.S. Pat. No. 6,279,046 to Armstrong et al., entitled Event-Driven Communications Interface for a Logically-Partitioned Computer; U.S. Pat. No. 5,659,786 to George et al., entitled System and Method for Dynamically Performing Resource Reconfiguration in a Logically Partitioned Data Processing System; and U.S. Pat. No. 4,843,541 to Bean et al., entitled Logical Resource Partitioning of a Data Processing System. The latter two patents describe implementations using the IBM S/360, S/370, S/390 and related architectures, while the remaining patents and applications describe implementations using the IBM i/Series™, AS/400™, and related architectures or variants thereof, it being understood that other system architectures could be used.

Detailed Description

Figure 1:
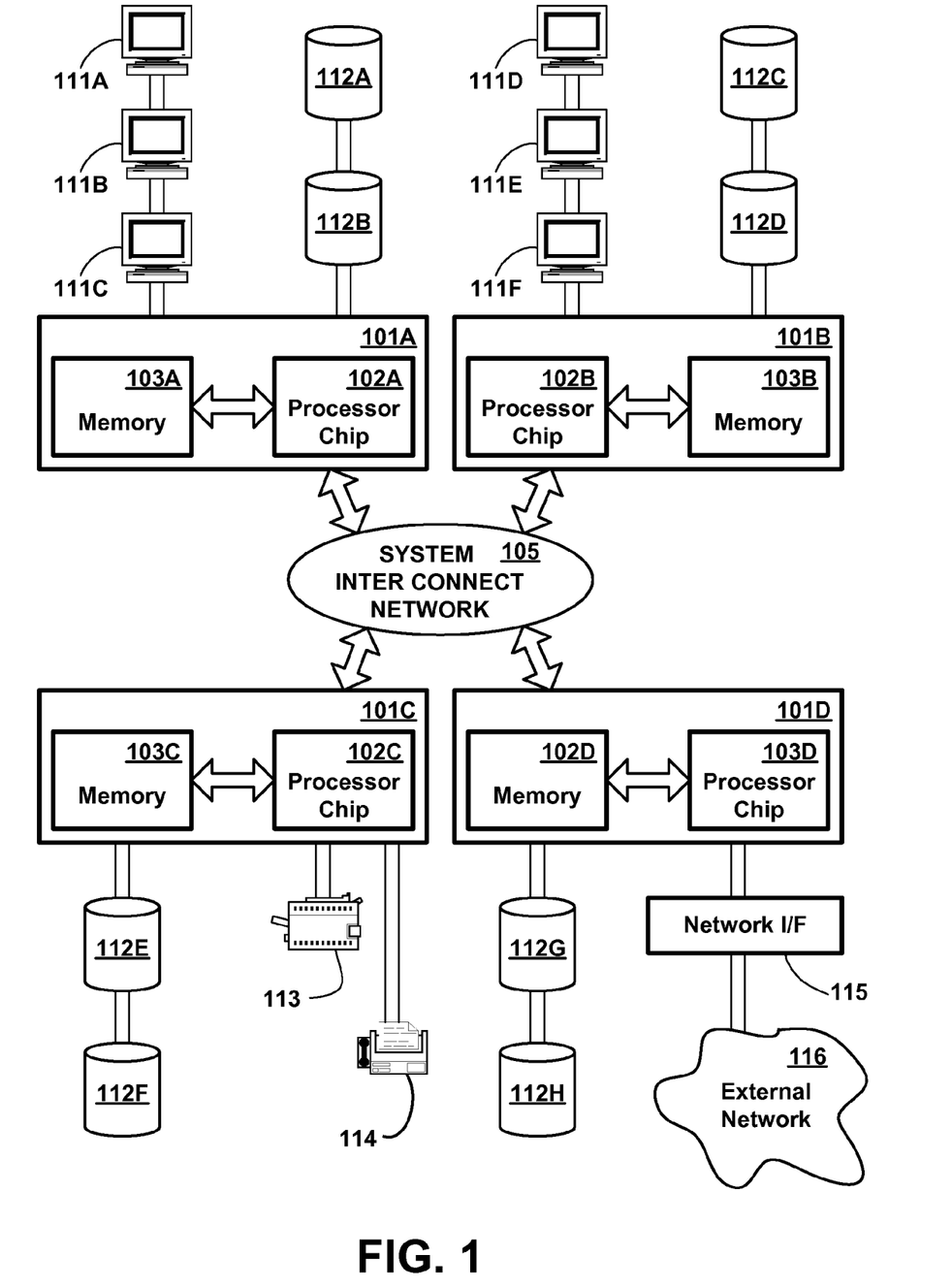
FIG. 1 is a high-level block diagram of the major hardware components of an exemplary multiprocessor computer system, according to the preferred embodiment of the present invention.

Referring to the Drawing, wherein like numbers denote like parts throughout the several views, FIG. 1 is a high-level block diagram of the major hardware components of an exemplary multiprocessor computer system 100 in accordance with the preferred embodiment of the present invention. Computer system 100 is designed according to a Non-Uniform Memory Access (NUMA) architecture, it being understood that a computer system in accordance with the present invention need not necessarily be a NUMA system. Computer system 100 comprises multiple nodes 101A-101D (herein generically referred to as feature 101), of which four are shown in the exemplary system of FIG. 1, it being understood that the number of nodes may vary. Each node includes a processor chip 102A-D (herein generically referred to as feature 102) and a local memory 103A-103D (herein generically referred to as feature 103).

Computer system 100 utilizes a distributed main memory, a respective portion of which is in each local memory 103. Collectively, these local main memory portions constitute the main memory of computer system 100. The main memory is addressable using a single common real address space, which is shared by all CPUs throughout the system. A respective portion of the real address space is allocated to each local memory in a persistent, fixed manner. I.e., the address space allocation does not change with each task, process, user, or similar parameter, although it may be possible to change the allocation by reconfiguring the system. Thus, the real address space of main memory is constant across the entire system. A processor in any node can directly access the entire real address space of main memory, i.e, can access memory in its own node or in a different node; however, access time for accessing memory in a different node is not necessarily the same as for memory in its own node. Additionally, a portion of each local memory may be allocated as a cache for temporarily storing data from other local memory portions.

The nodes are connected to one another by an inter-node communications network 105 that permits any node to communicate with any other node. The purpose of inter-node communications network is to allow devices to communicate across node boundaries, and in particular, to allow a processor in any node to access the memory resident in any other node. Inter-node communications network 105 may employ any technique, now known or hereafter developed, for supporting communication among multiple nodes in a computer system. Ideally, the inter-node communications medium should provide high bandwidth and low latency, and be scalable to allow for the addition of more nodes. Network 105 may be arranged as a set of point-to-point interconnection links, as a ring topology, as a common multi-drop bus topology, or in some other manner. Connections may be wired or wireless (e.g, optical), depending on system performance needs. As just one example, network 106 may be a switch-based network that uses the Scalable Coherent Interface (SCI) interconnection mechanism conforming to the IEEE 1596-1992 or subsequent standard. Although the inter-node connection is as fast as practicable given the design constraints, it is a characteristic of a NUMA architecture that it is substantially slower than communication within a node, i.e., that a processor in a given node can access its local memory faster than it can access memory in a different node.

Each node may be coupled to one or more I/O devices. For example, user terminals or workstations 111A-111C are shown coupled to node 101A, and user terminals or workstations 111D-111F are shown coupled to node 101B. Direct access storage devices 112A-B, 112C-D, 112E-F and 112G-H (herein referred to generically as feature 112, which are typically rotating magnetic disk drive storage devices, although they could alternatively be other devices, including arrays of disk drives configured to appear as a single large storage device to a host) are shown coupled to nodes 101A, 101B, 101C and 101D, respectively. Printer 113 and fax machine 113 are shown coupled to node 101C. Various other or additional types of I/O devices could be used. Network interface 115 for communicating with external network 116 is shown coupled to node 101D. Network 116 may be any of various local or wide area networks known in the art. For example, network 116 may be an Ethernet local area network, or it may be the Internet. Additionally, network interface 115 might support connection to multiple networks.

Figure 2:
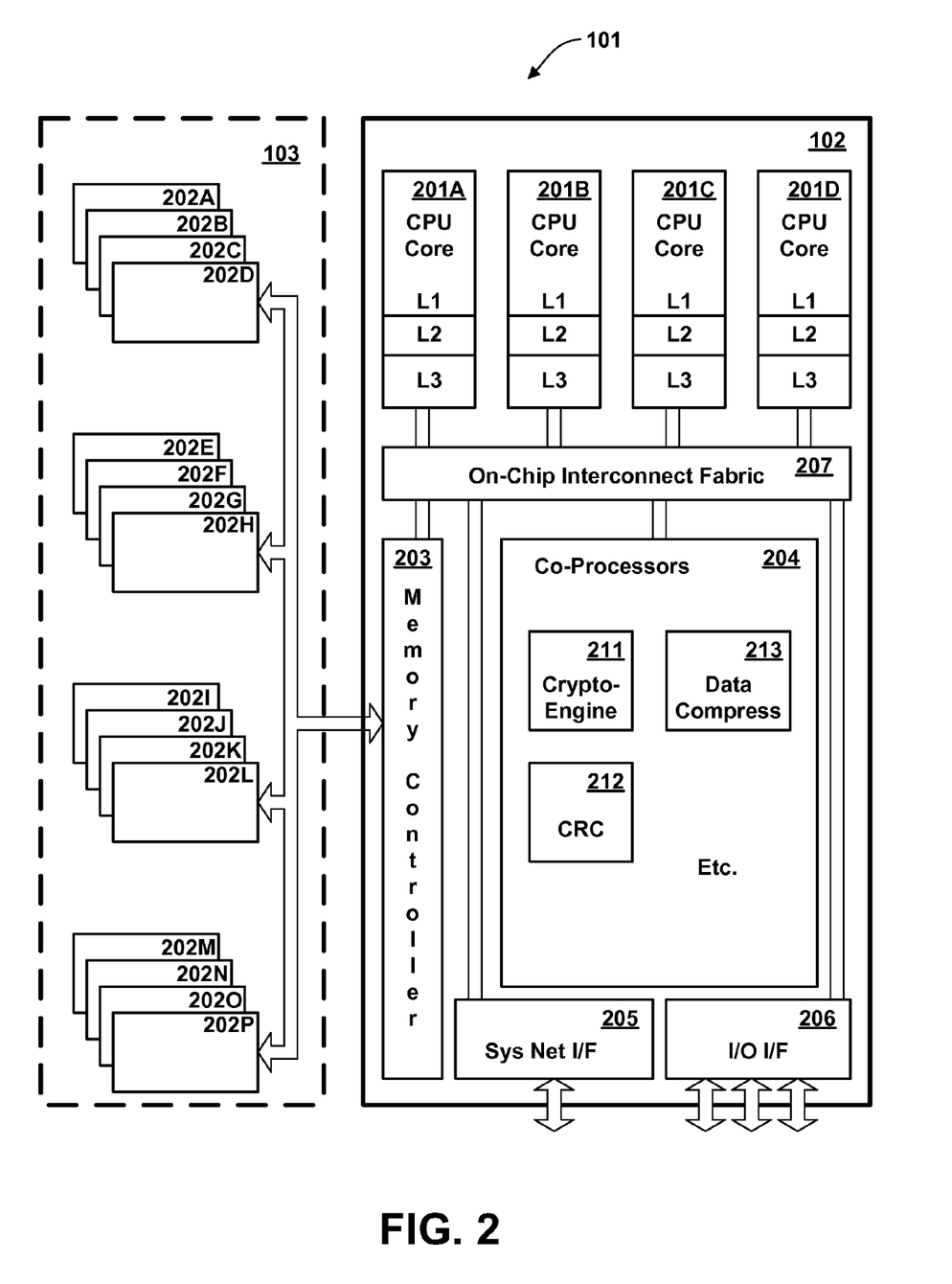
FIG. 2 is a high-level block diagram of the major hardware components of a typical node of a computer system of the preferred embodiment.

FIG. 2 is a block diagram of the major hardware components of a typical node 101 of computer system 100 in accordance with the preferred embodiment. Node 101 includes a single processor chip 102 coupled to multiple local memory chips 202A-P (herein generically referred to as feature 202), which collectively form local memory 103. Processor chip 102 comprises multiple central processing unit (CPU) cores 201A-D (herein generically referred to as feature 201, of which four are shown in FIG. 2), a memory controller/interface 203 for communicating with local memory chips 202, a set of coprocessors 204, a system network interface 205 for communicating with other nodes via system interconnect network 105, and an I/O device interface 206 for communicating with various I/O devices which are coupled to node 101 external to processor chip 102. An on-chip interconnect fabric 207 provides communication paths internal to processor chip 102 among the multiple components of the processor chip; although illustrated in FIG. 2 as a single entity, on-chip interconnect fabric 207 may comprise multiple buses or other communication paths, which may be dedicated or shared, and arranged according to any appropriate topology now known or hereafter developed. Physically, node 101 is preferably implemented as multiple integrated circuit chips, including processor chip 102 and memory chips 202, mounted on as single circuit card, and having embedded printed circuit connections running among the various chips.

Each CPU core 201 independently performs basic machine processing functions on instructions and other data from main memory, and maintains its state independently of the other CPU cores. Each CPU core thus contains all the required elements of a central processing unit; it is referred to herein as a "CPU core" or "core" because multiple such CPU cores are implemented on a single integrated circuit processor chip. Each CPU core preferably contains or controls a respective set of L1, L2 and L3 caches for temporary storage of data and instructions. Caches could alternatively be shared among multiple CPU cores. For example, each CPU core may contain a respective level 1 instruction cache (L1 I-cache) and a respective level 1 data cache (L1 D-cache) while a lower level cache such as an L3 cache might be shared by more than one CPU core.

Coprocessor set 204 contains one or more coprocessors 211-213 which perform auxiliary functions on behalf of processes executing in CPU cores 201. Each coprocessor contains hardware logic, generally implemented as a multi-stage pipeline, for performing a particular function or set of functions. A coprocessor is shared among the various CPU cores 201, and is not dedicated to use by any one CPU core. A CPU core uses a coprocessor to perform a corresponding function by passing input parameters (such as operand data or a memory reference to the operand data, a type of operation to be performed, a data length, a location for storing a result, etc.) to the coprocessor. The coprocessor generates a result and returns it to the CPU core or stores it in a designated location.

FIG. 2 illustrates three coprocessors in coprocessor set 204, including a crypto-engine 211, a cyclic redundancy check (CRC) function 212, and a data compression function 213, it being understood that a coprocessor set could include other or additional functions. Of particular significance herein is crypto-engine 211. Crypto-engine 211 encrypts and decrypts selective data when invoked by a CPU core. In the preferred embodiment, the CPU core passes a reference to data to be encrypted or decrypted, a reference to a data encryption or decryption key, and a result reference. The references are real memory addresses. The crypto-engine then retrieves the data and the key at the referenced real memory addresses (generally, retrieval is from cache), performs the required transformation, and stores the result in a designated real memory location. This operation is performed entirely in hardware in the crypto-engine, and requires no instructions executing on the CPU core or other software level instructions, other than the encrypt or decrypt instructions required to invoke the crypto engine.

It should be understood that FIGS. 1 and 2 are intended to depict the representative major components of system 100 at a high level, that individual components may have greater complexity than represented in FIGS. 1 and 2, that components other thans or in addition to those shown in FIGS. 1 and 2 may be present, and that the number, type and configuration of such components may vary, and that a large computer system will typically have more components than represented in FIGS. 1 and 2. Several particular examples of such additional complexity or additional variations are disclosed herein, it being understood that these are by way of example only and are not necessarily the only such variations.

While a system having four nodes is shown in FIG. 1, and a typical node having four CPUs and various other devices is shown in FIG. 2, it should be understood that FIGS. 1 and 2 are intended only as a simplified example of one possible configuration of a system for illustrative purposes, that the number and types of possible devices in such a configuration may vary, and that the system often includes additional devices not shown. In particular, it would alternatively be possible to construct a complete system with a single node, in which all main memory is contained in that node and all I/O devices are coupled to that node, or using some other architecture which is not a NUMA architecture. It would further be possible to construct a system having only a single CPU per node. In addition, while a certain packaging arrangement is depicted in which multiple CPU cores and certain associated cache structures are present on a single chip, it will be understood that there are many variations in packaging arrangement, and that entities shown on the same chip could be implemented on different chips and vice-versa. Furthermore, while logically partitioned systems typically contains multiple CPUs, it would be possible to construct a logically partitioned system having only a single CPU, which is time interleaved or otherwise shared among multiple partitions. It should further be understood that, if multiple nodes are present, it is not required that all nodes be identically configured, that all nodes have the same number of CPUs or the same amount of addressable local memory, or that all nodes have attached I/O buses and I/O devices.

While certain I/O paths are shown connecting the I/O devices to their respective nodes, I/O paths or buses may be shared by devices or dedicated in any combination. Although the I/O device are shown distributed among various nodes, it would be possible to attach all I/O devices to a single node or subset of nodes. Computer system 100 depicted in FIG. 1 has multiple attached terminals 111A-111F, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input.

While co-processors 204, and particularly crypto-engine 211, are separate from processor cores 201 and shared by multiple cores in the representative embodiment shown in FIG. 2, it will be appreciated that each processor core could alternatively have its own dedicated co-processor or co-processors, and that such co-processors could be integrated into the processor core.

While various system components have been described and shown at a high level, it should be understood that a typical computer system contains many other components not shown, which are not essential to an understanding of the present invention. In the preferred embodiment, computer system 100 is a computer system based on the IBM i/Series™ architecture, it being understood that the present invention could be implemented on other computer systems.

Figure 3:
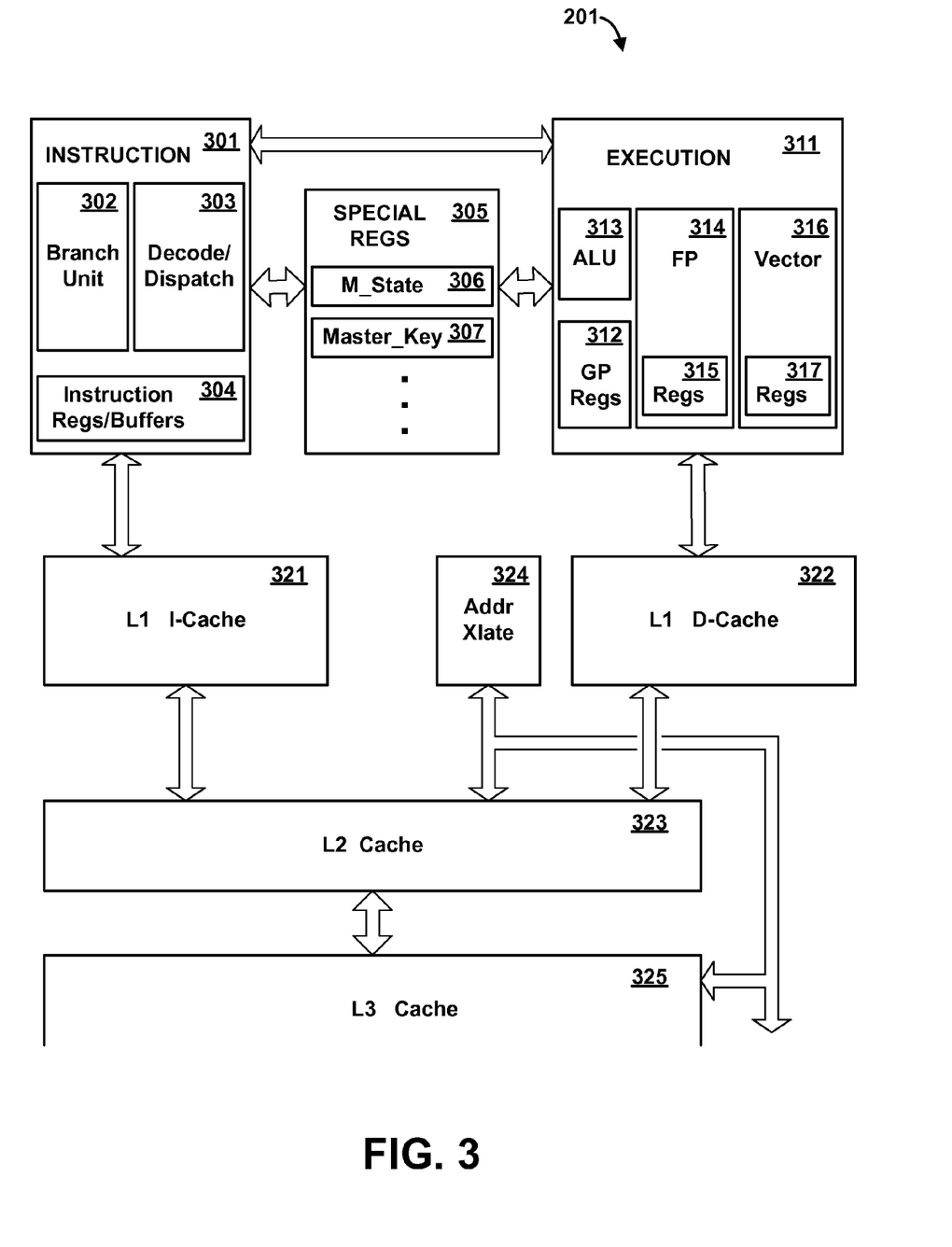
FIG. 3 is a high-level diagram of the major components of a CPU core including certain associated cache structures, according to the preferred embodiment.

FIG. 3 is a high-level diagram of the major components of a CPU core 201 including certain associated cache structures, according to the preferred embodiment, showing CPU core 201 in greater detail than is depicted in FIG. 2. CPU core 201 includes instruction unit portion 301, special register portion 305, and execution unit portion 311. Also shown in FIG. 3 are Level 1 Instruction Cache (L1 I-Cache) 321, Level 1 Data Cache (L1 D-Cache) 322, Level 2 Cache (L2 Cache) 323, Address Translation unit 324, and Level 3 Cache (L3 Cache 325. In general, instruction unit 301 obtains instructions from L1 I-cache 321, decodes instructions to determine operations to perform, and resolves branch conditions to control program flow. Execution unit 311 performs arithmetic and logical operations on data in registers, and loads or stores data from L1 D-Cache 322. Special registers 305 contain various state data for controlling instruction flow and proper operation of the CPU, other than the instructions and data operands themselves. L2 Cache 323 is a level 2 cache, generally larger that L1 I-Cache 321 or L1 D-Cache 322, providing data to L1 I-Cache 321 and L1 D-Cache 322. L2 Cache 323 obtains data from a lower level L3 cache 325, or from main memory through an external interface.

Caches at any level are logically extensions of main memory. In the exemplary embodiment, L1, L2 and L3 caches are packaged on the same integrated circuit chip as the CPU core, and for this reason are sometimes considered a part of the CPU core. In this embodiment, each CPU core has its own respective L1, L2 and L3 caches, which are not shared with other cores. The representation of FIG. 3 is intended to be typical, and is not intended to limit the present invention to any particular physical or logical cache implementation. It will be recognized that processors and caches could be designed according to different arrangements, and the processor chip or chips may include more caches or fewer caches than represented in FIG. 3.

Instruction unit 301 comprises branch unit 302, instruction decode/dispatch unit 303, and instruction registers and buffers 304. Instructions from L1 I-cache 321 are loaded into buffers 304 prior to execution. Depending on the CPU design, there may be multiple buffers (e.g., buffers for different threads, or within a thread, one for a sequential series of instructions, and others for branch-to locations), each of which may contain multiple instructions. Decode/dispatch unit 303 selects one or more instructions to be dispatched for execution from one or more of buffers 304 in a current machine cycle, and decodes the instruction(s) to determine the operation(s) to be performed or branch conditions. Branch unit 302 controls the program flow by evaluating branch conditions, and refills buffers 304 from L1 I-cache 321.

Execution unit 311 comprises a set of general purpose registers 312 for storing data and a scalar arithmetic logic unit (ALU) 313 for performing arithmetic and logical operations on data in GP registers 312 responsive to instructions decoded by instruction unit 301. Execution unit further includes floating point operations subunit 314, and a vector execution subunit 316. Floating point subunit 314 is a special floating point hardware pipeline for performing floating point operations using double-precision (64-bit) operands. Vector execution subunit 316 performs certain vector operations in parallel, i.e., performs a common operation on multiple operands in parallel. Although referred to herein as a vector execution subunit, this is merely descriptive of potential capability. In fact, vector subunit 316 simply performs mathematical operations on data, and can be used for any or various applications requiring mathematically intensive operations. Floating point subunit 314 and vector subunit 316 each includes its own respective set of registers 315, 317. In addition to components shown in FIG. 3, execution unit 311 may include additional logic, counters, control hardware, and so forth. In particular, execution unit 311 may include execution pipelines (not shown) in addition to integer ALU 313, floating point subunit 314, and vector subunit 316.

Special registers 305 contain state data other than instructions (contained in instruction registers 304) and general purpose data upon which instructions operate (contained in registers 312, 315, 317). For example, special registers 305 may include condition registers containing operation result flags which are used for determining branch conditions, interrupt vectors, error indications, and so forth. In particular, in accordance with the preferred embodiment, special registers include a machine state register 306 and a master key address register 307. Machine state register 306 includes data indicating a privilege level of a currently executing thread; these include a hypervisor level corresponding to a thread having hypervisor privileges, and one or more levels corresponding to threads which do not have hypervisor privileges. If CPU core 201 supports concurrent execution of multiple threads, a separate privilege level may exist for each currently executing thread. Master key address register 307 contains a real address in memory of a master key used for encrypting/decrypting data, as explained in greater detail herein. This is the master key corresponding to the partition to which the CPU core is currently allocated. In accordance with the preferred embodiment, each CPU core is allocated to one and only one logical partition at any instant in time, although this allocation may change from time to time.

L1 I-cache 321 and L1 D-cache 322 are separate instruction and data caches providing data to instruction and execution units. L2 cache 323 and L3 cache 325 are non-discriminated caches containing both instructions and non-instruction data. Typically, data is taken from or stored to an L1 cache by the instruction or execution unit, and if the data is unavailable in an L1 cache, it is loaded into the L1 cache from L2 cache 323, which in turn obtains it from L3 cache 325 or external memory. Depending on the processor design, it may be possible to by-pass a cache at one level and load data from a lower level cache or memory.

Address translation unit 324 translates effective addresses (in some architectures, called "virtual addresses" or some other name) generated by instruction unit 301 or execution unit 311 to corresponding real addresses in memory. As is known in the art, a fundamental difference exists between effective addresses on the one hand, and real addresses on the other. An effective address has no fixed correspondence to a physical memory location; this correspondence changes as new pages are loaded into main memory from storage, as processes change, and so forth. A real address corresponds to a fixed physical memory location, although it does not necessarily translate directly to the location. The processor generates effective addresses (which may be called "virtual" or some other term) in an effective address space corresponding to each respective executing process. In some computer architectures, there are multiple levels of effective or virtual address, which may require further translation. The effective addresses are further translated to "real addresses", corresponding to the actual memory locations at which the data is located by address translation unit 324. It will be understood that various computer architectures employ different addressing constructs, and the present invention is not limited to any particular form of addressing.

L1 I-Cache 321 and L1 D-Cache 322 are preferably addressed using effective addresses, and therefore no address translation is required for accessing the level 1 caches. However, the L2 Cache 323 and all memory below it are addressed using real addresses. Therefore, if it is necessary to access a lower level cache or main memory, an effective address generated by the processor is first translated to a real address.

Address translation unit 324 is represented as a single logical entity, but typically includes multiple tables and logic circuitry, which may be distributed in various chip locations. For example, an address translation mechanism may include a translation look-aside buffer, an effective-to-real address translation table, a segment table, and additional structures. Additionally, separate structures could be used for translation of instructions and for non-instruction data.

CPU core 201 may be a multithreaded processor supporting the concurrent execution of multiple threads and simultaneous dispatching of instructions from different threads in the same machine cycle, or it may be a single threaded processor. Where multi-threading is supported, a separate set of most registers exists for each thread. I.e., a separate set of general purpose registers 312, floating point registers 315, and vector registers 317, exists for each thread. Additionally, certain other state or special purpose registers may be duplicated to support multiple active threads. The execution unit pipeline hardware, the instruction unit, and the caches are shared by all threads. Whether multi-threaded or single threaded, all threads execute in the same logical partition at any given instant in time.

While various CPU components have been described and shown at a high level, it should be understood that the CPU of the preferred embodiment contains many other components not shown, which are not essential to an understanding of the present invention. For example, various additional special purpose registers will be required in a typical design. Furthermore, it will be understood that the CPU core of FIG. 3 is simply one example of a CPU architecture, and that many variations could exist in the number, type and arrangement of components within CPU core 201, that components not shown may exist in addition to those depicted, and that not all components depicted might be present in a CPU design. For example, the number and configuration of buffers and caches may vary; the number and function of execution unit pipelines may vary; registers may be configured in different arrays and sets; dedicated floating point hardware may or may not be present; etc. Furthermore, CPU core 201 may have a simple or complex instruction set.

As explained above and represented in FIGS. 1-3, at the level of physical hardware there is no concept of partitioning. For example, any processor can access busses which communicate with memory and other components, and thus access any memory address, I/O interface processor, and so forth. Partitioning, i.e., restrictions on the access to certain system resources, is accomplished by low-level partition management code.

Figure 4:
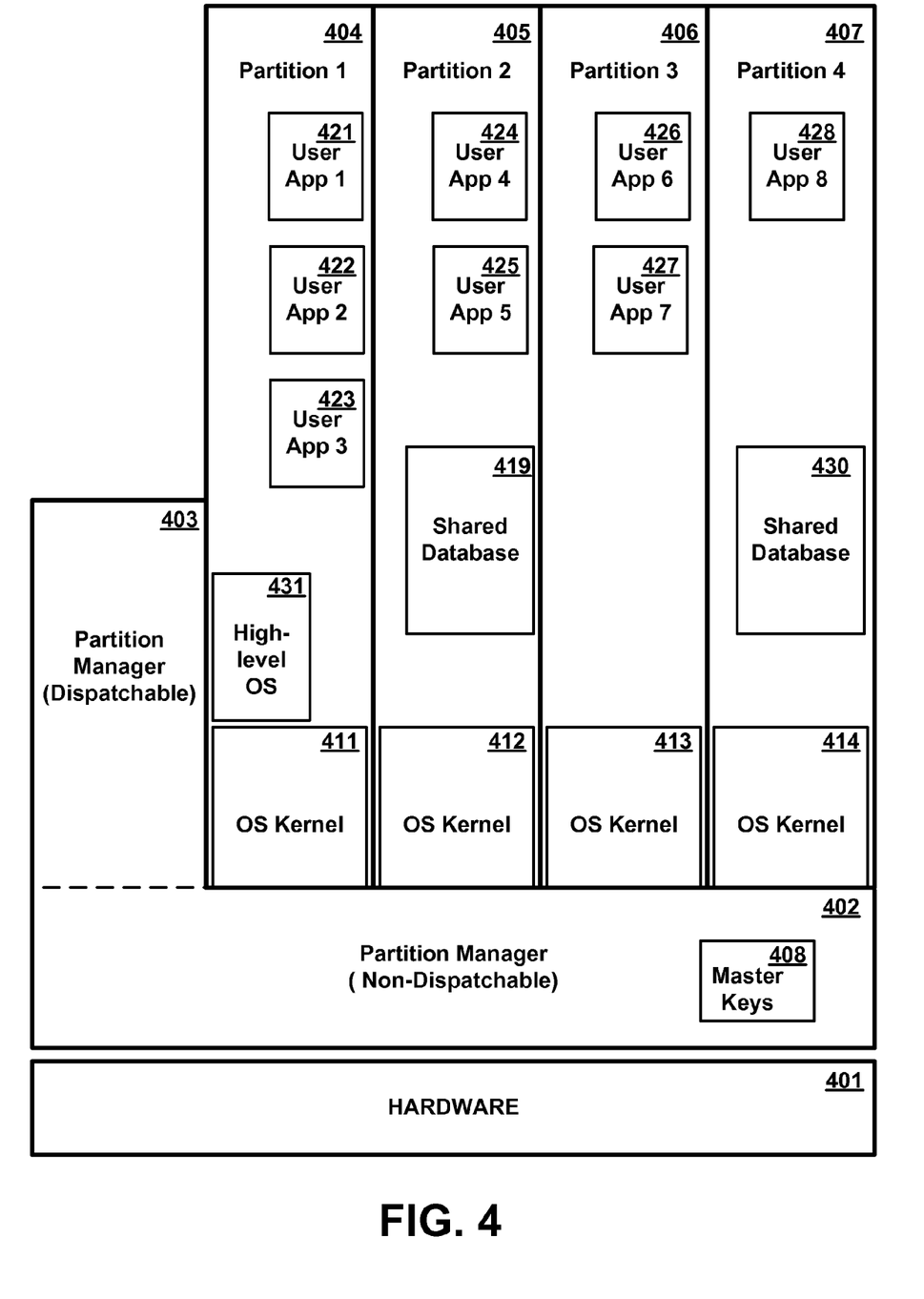
FIG. 4 is a conceptual illustration showing the existence of logical partitions at different hardware and software levels of abstraction in computer system, according to the preferred embodiment.

FIG. 4 is a conceptual illustration showing the existence of logical partitions at different hardware and software levels of abstraction in computer system 100. FIG. 4 represents a system having four logical partitions 404-407 available for user applications, designated "Partition 1", "Partition 2", etc., it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 4, the "higher" levels of abstraction are represented toward the top of the figure, while lower levels are represented toward the bottom.

As shown in FIG. 4 and explained earlier, logical partitioning is a code-enforced concept. At the hardware level 401, logical partitioning does not exist. As used herein, hardware level 401 represents the collection of physical devices (as opposed to data stored in devices), such as processors, memory, buses, I/O devices, etc., shown in FIGS. 1-3, including other hardware not shown in FIGS. 1-3, if any. As far as a CPU core 201 is concerned, it is merely executing machine level instructions. In the preferred embodiment, each CPU core 201 is identical and more or less interchangeable. While code can direct tasks in certain partitions to execute on certain processors, there is nothing in the processor itself which dictates this assignment, and in fact the assignment can be changed by the code. Therefore the hardware level is represented in FIG. 4 as a single entity 401, which does not itself distinguish among logical partitions.

Partitioning is enforced by a partition manager (also known as a "hypervisor"), consisting of a non-relocatable, non-dispatchable portion 402 (also known as the "non-dispatchable hypervisor" or "partitioning licensed internal code" or "PLIC"), and a relocatable, dispatchable portion 403. The hypervisor is super-privileged executable code which is capable of accessing resources, and specifically processor resources and memory, in any partition. The hypervisor maintains state data in various special purpose hardware registers, and in tables or other structures in general memory, which govern boundaries and behavior of the logical partitions. Among other things, this state data defines the allocation of resources in logical partitions, and the allocation is altered by changing the state data rather than by physical reconfiguration of hardware.

In the preferred embodiment, the non-dispatchable hypervisor 402 comprises non-relocatable instructions which are executed by CPU core 201 just as instructions for tasks executing in the partitions. The code is non-relocatable, meaning that the code which constitutes the non-dispatchable hypervisor is at a fixed real address in memory. Non-dispatchable hypervisor 402 has access to the entire real memory range of system 100, and can manipulate real memory addresses. The dispatchable hypervisor code 403 (as well as all partitions) is contained at addresses which are relative to a logical partitioning assignment, and therefore this code is relocatable. The dispatchable hypervisor behaves in much the same manner as a user partition (and for this reason is sometimes designated "Partition 0"), but it is hidden from the user and not available to execute user applications. In general, non-dispatchable hypervisor 402 handles assignment of tasks to physical processors, memory mapping and partition enforcement, and similar essential partitioning tasks required to execute application code in a partitioned system, while dispatchable hypervisor 403 handles maintenance-oriented tasks, such as creating and altering partition definitions.

As represented in FIG. 4, there is no direct path between higher levels (levels above non-dispatchable hypervisor 402) and hardware level 401. While machine instructions of tasks executing at higher levels can execute directly on the processor, access to resources (and particularly memory resources) is controlled by the non-dispatchable hypervisor. Non-dispatchable hypervisor 402 enforces logical partitioning of processor resources by presenting a partitioned view of hardware to the task dispatchers at higher levels. I.e., task dispatchers at a higher level (the respective operating systems) dispatch tasks to virtual processors defined by the logical partitioning parameters, and the hypervisor in turn dispatches virtual processors to physical processors at the hardware level 401 for execution of the underlying task. The hypervisor also enforces partitioning of other resources, such as allocations of memory to partitions, and routing I/O to I/O devices associated with the proper partition.

Dispatchable hypervisor 403 performs many auxiliary system management functions which are not the province of any partition. The dispatchable hypervisor generally manages higher level partition management operations such as creating and deleting partitions, concurrent hardware maintenance, allocating processors, memory and other hardware resources to various partitions, etc.

Above non-dispatchable hypervisor 402 are a plurality of logical partitions 404-407. Each logical partition behaves, from the perspective of processes executing within it, as an independent computer system, having its own memory space and other resources. Each logical partition therefore contains a respective operating system kernel herein identified as the "OS kernel" 411-414. At the level of the OS kernel and above, each partition behaves differently, and therefore FIG. 4 represents the OS Kernel as four different entities 411-414 corresponding to the four different partitions. In general, each OS kernel 411-414 performs roughly equivalent functions. However, it is not necessarily true that all OS kernels 411-414 are identical copies of one another, and they could be different versions of architecturally equivalent operating systems, or could even be architecturally different operating system modules. OS kernels 411-414 perform a variety of task management functions, such as task dispatching, paging, enforcing data integrity and security among multiple tasks, and so forth.

Above the OS kernels in each respective partition there may be a set of high-level operating system functions, and user application code, databases, and other entities accessible to the user. Examples of such entities are represented in FIG. 4 as user applications 421-428, shared databases 429-430, and high-level operating system 431, it being understood that these are shown by way of illustration only, and that the actual number and type of such entities may vary. The user may create code above the level of the OS Kernel, which invokes high level operating system functions to access the OS kernel, or may directly access the OS kernel. In the IBM i/Series™ architecture, a user-accessible architecturally fixed "machine interface" forms the upper boundary of the OS kernel, (the OS kernel being referred to as "SLIC"), but it should be understood that different operating system architectures may define this interface differently, and that it would be possible to operate different operating systems on a common hardware platform using logical partitioning.

Processes executing within a partition may communicate with processes in other partitions in much the same manner as processes in different computer systems may communicate with one another, i.e., using any of various communications protocols which define various communications layers. At the higher levels, inter-process communications between logical partitions is the same as those between physically separate computer systems. But at lower levels, it is not necessary to traverse a physical transmission medium to a different system, and executable code in the partition manager or elsewhere (not shown) may provide a virtual communications connection.

A special user interactive interface is provided into dispatchable hypervisor 403, for use by a system administrator, service personnel, or similar privileged users. This user interface can take different forms, and could be through a special hardware management console (not shown), or through a standard user terminal on which the privileged user logs on. It is expected that this interface be protected against unauthorized use by any of various protection mechanisms as are appropriate; such protection is beyond the scope of the present disclosure.

While various details regarding a logical partitioning architecture have been described herein as used in the preferred embodiment, it will be understood that many variations in the mechanisms used to enforce and maintain logical partitioning are possible consistent with the present invention, and in particular that administrative mechanisms such as a service partition, service processor, dispatchable hypervisor, and so forth, may vary in their design, or that some systems may employ some or none of these mechanisms, or that alternative mechanisms for supporting and maintaining logical partitioning may be present.

It will be understood that FIG. 4 is a conceptual representation of partitioning of various resources in system 100. In general, entities above the level of hardware 401 exist as addressable data entities in system memory. However, it will be understood that not all addressable data entities will be present in memory at any one time, and that data entities are typically storage in storage devices 112 and paged into main memory as required.

Each partition has a respective address space for its effective or virtual addresses, which is not shared with other partitions. The sizes of these partition address spaces may be the same or may be different. These addresses are mapped to real addresses in the real address space of main memory. The mappings to real addresses are governed by non-dispatchable hypervisor 402. In the preferred embodiment, this is accomplished calling the non-dispatchable hypervisor to manage the page table whenever a page is loaded from storage. However, it might alternatively be accomplished by other means, e.g., partitioning real memory on fixed boundaries and allowing the OS kernels to manage pages within each respective real memory portion.

In the preferred embodiment, non-dispatchable hypervisor 402 occupies a range of real memory addresses (not necessarily contiguous) which does not correspond to any effective or virtual address in a partition address space. I.e., there is no address in the address space of a partition which would map to the reserved area of real addresses used by non-dispatchable hypervisor code and select data structures. Therefore, no matter what address a task executing within a partition attempts to access, it can not access the reserved address space of the non-dispatchable hypervisor. It can only call the hypervisor to perform some service requiring access to this resource.

In the preferred embodiment, the master encryption keys for the various partitions are stored in a master key table 408 within this reserved area of real addresses used by the non-dispatchable hypervisor. A master key for any partition is for that partition only, and is not shared with any other partition. In the preferred embodiment, each partition has a single master key, although it would alternatively be possible to provide multiple master keys for each partition, or to provide keys for some partitions and not others. Although referred to as a "table", master key table may be organized according to any of various techniques for structuring data, now known or hereafter developed.

In the preferred embodiment, each master key is a key for encrypting and decrypting data using a symmetric data encryption/decryption algorithm. A suitable such algorithm is the AES algorithm, it being understood that other algorithms could be used. Alternatively, it would be possible to use any of various public/private key encryption algorithms (in which the private key would generally be stored as the master key). Various such algorithms exist today and are known in the art. Any such algorithm or algorithms, now known or hereafter developed, could be used consistent with the present invention, the exact choice of algorithm depending on various design considerations.

Symmetric key encryption algorithms have the characteristic that a common encryption key is required both to encrypt the data and to decrypt it. I.e., without the key, it is not algorithmically feasible to encrypt the data in the first place, as well as to decrypt it. Algorithms exist for generating a key, typically using a random number as a seed. If a symmetric key encryption algorithm is used herein, then the same procedure of invoking the crypto-engine using a special hardware instruction, as described herein, is used for both encrypting data and for decrypting data.

Public/private key encryption algorithms have the characteristic that they perform a one-way data transformation using a key. By "one-way" it is meant that it is not algorithmically feasible to perform a reverse data transformation to obtain the original data, having only the transformed data and the key used to construct it. However, it is possible to perform a reverse data transformation with a second key. The two keys therefore form a pair, with which it is possible to perform a complete transformation and reverse transformation of data.

The one-way nature of the data transformations necessarily implies that it is not algorithmically feasible to obtain one key from the other, for if it were, it would be possible to perform the reverse data transformation by simply generating the other key. However, since there must be a way to generate the two keys initially, a further characteristic of a public/private key encryption algorithm is that it is possible to algorithmically generate a pair of keys. The key generation algorithm itself requires some input data (a seed), so that it will not always generate the same key pair. Typically, this is accomplished by seeding a key generation algorithm with a random number.

In the preferred embodiment, a task executing within a partition generates a master key for a symmetric encryption algorithm (or a public/private key pair) by invoking an appropriate hypervisor function to do so. The hypervisor stores the master key in key table 408, and does not return it to the requesting task (in the case of a public/private key pair, it would return the public key to the requesting task, but not the private key). Thus, the master key is never visible to the requesting task, or to any other task executing within the partition.

In general, symmetric key encryption algorithms are more efficient than public/private key algorithms. It is expected that, in typical usage, data will be encrypted for secure storage to prevent unauthorized persons from accessing the data while it is stored on the computer system. Specifically, in this typical application, the same user or relatively small group of authorized users both creates the data (and encrypts it), and later accesses the data (decrypts it). In such an application, there is no particular advantage to a public/private key encryption algorithm, and therefore the more efficient symmetric key algorithm is preferred.

However, there are other applications where public/private key algorithms may be useful. Specifically, such algorithms are commonly used to encrypt and decrypt data being transmitted over an unsecure medium, where the data is created by a first user and intended to be read by a second. In this environment, the unprotected public key is used to encrypt data, and the private key is used for decryption. The public key is provided to the first user, or any user wishing to transmit data to the second user. Thus, anyone might be able to encrypt data for use by the second user, but only the second user (possessing the private key) can decrypt it.

Public/private key algorithms can also be used in an alternative mode in which the private key is used to generate the encrypted version of the data, while the public key is used to decrypt it. Obviously, such a usage is not intended to protect the data from being read, since anyone with the public key can decrypt and read the data. This usage is intended to authenticate data. The encrypted version of the data is referred to as a digital signature, and it normally accompanies a plain text version of the data to authenticate the plain text version. Since only the originator of the data has the private key, only the originator can generate an encrypted version, i.e., generate a digital signature. By performing the reverse transformation (decryption) with the public key and comparing the decrypted data to the plain text version, anyone can verify that the plain text version is the same as what the originator had encrypted in the digital signature. Thus data is protected from alteration, as opposed to access, by third parties. Unless the data being authenticated by a digital signature is very brief, it is common to generate a digital signature from a hashing of the data, since an encryption of the entire data may result in unreasonably large digital signatures.

In accordance with the preferred embodiment, the master key could be a two-way symmetric key for encrypting and decrypting data, or could be a private key for decrypting data, or could be a private key for generating digital signatures, or a private key for both decryption and generating digital signatures, but the primary use is expected to be encryption/decryption. Furthermore, it should be understood that the data being encrypted/decrypted could be any information whatsoever, including other encryption keys. I.e., there may be a hierarchy of encryption keys, which may be of the same type or of mixed types, whereby multiple encryption keys are themselves encrypted/decrypted as described herein using a symmetric master key or private master key/public key pair.

As used above, "algorithmically feasible" refers to the capability to perform an act (in this case, a data transformation) using a known algorithm which is guaranteed to, or which will in general, complete in a reasonable time. In the mathematical sense, it is possible to break any code by systematically generating every possible key combination, but the number of keys is usually sufficiently large to make this impractical. There may be other codebreaking heuristics which are beyond the scope of the present disclosure. Additionally, a hash function is always a reduction of data, and so the mere fact that the hashed derivation of data matches something is not a mathematical proof of identity. But for a properly chosen hash function, the probability that a data alteration will result in exactly the same hash function is minuscule. The detection mechanisms described herein are not necessarily impossible to circumvent, but are intended to make circumvention extremely difficult. No encryption algorithm, detection technique, or other security mechanism can claim to forever defeat the ingenuity of potential interlopers, but these techniques can make it enormously difficult to compromise protected data without detection.

In the preferred embodiment, CPU cores 201 are not permanently assigned to partitions, but are shared on a time interleaved basis. Generally, a partition is allocated a certain number of virtual processors, each having an assigned measure of processing capability. The total of all virtual processors of all partitions typically exceeds the number of physical CPU cores, although the processing capability of the virtual processors is often less than that of an actual physical core. By time interleaving the cores, each partition can be afforded the equivalent of its corresponding processor capability. Time interleaving can be performed on a fixed interval basis according to the proportion of processing power assigned to each partition, or more sophisticated scheduling techniques can be used which allow variable length time intervals to be assigned, and thus take advantage of slack periods in one partition to increase processor allocations to a more busy partition. Any appropriate scheduling technique, now known or hereafter developed, may be used.

When it is necessary to alter the partition to which a CPU core is assigned, the currently executing process is interrupted (if required), and the non-dispatchable hypervisor is invoked to change partition context. This process is illustrated at a high level in FIG. 5.

Figure 5:
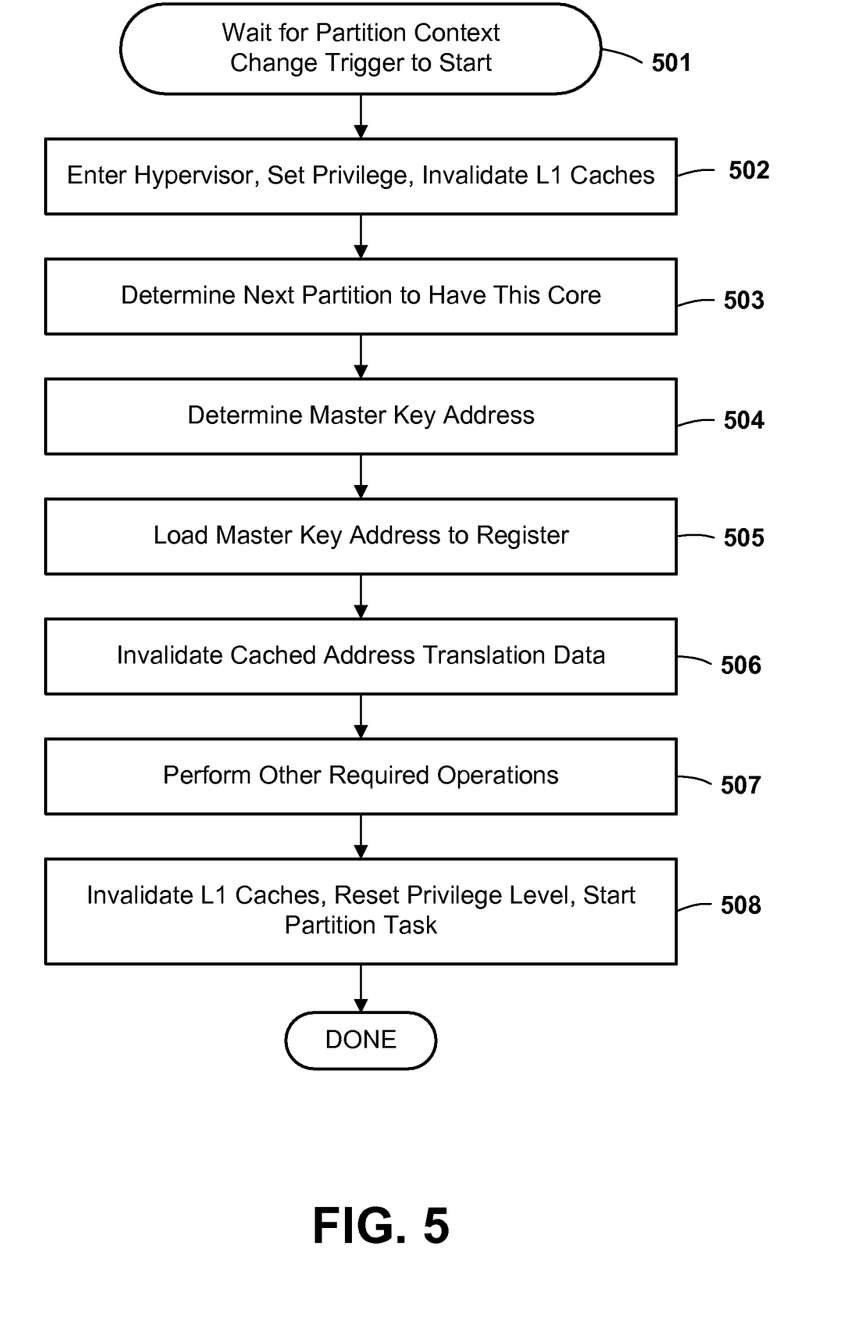
FIG. 5 is a flow diagram showing a process of changing a partition context of a CPU core, according to the preferred embodiment.

Referring to FIG. 5, the partition context change waits for some triggering event, such as time elapsed, as described above, to re-assign the CPU core (step 501). For example, a clock-based interrupt can call the partition context change function within the hypervisor. The partition context change function might also be called by another hypervisor process.

Calling the hypervisor causes the privilege level in machine state register 306 to be set to hypervisor level, and the contents of the L1 caches to be invalidated (step 502). The L1 caches are invalidated because they are accessed with effective addresses, i.e. addresses in the address space of the partition. The hypervisor uses a different address space. If the partition context change function is called from another hypervisor procedure, then step 502 is unnecessary, since it would have been performed when the other hypervisor procedure was called. In the preferred embodiment, a single machine instruction which enters the hypervisor simultaneously sets the privilege level; this is the only way in which the hypervisor privilege can be set, and thus the privilege level can not be set to hypervisor level without simultaneously branching to a hypervisor entry point.

The hypervisor code executing in the CPU core determines a next partition to which the CPU core will be allocated (step 503). It then determines a master key address in real memory of the key corresponding to the selected next partition, using any available indexing mechanism for key table 408 (step 504). This master key address is loaded into master key address register 307 (step 505). Loading the master key address register requires hypervisor level privileges, i.e., at the level of the machine instructions, a single machine-level instruction simultaneously loads a value into master key address register 307 and performs a check of the privilege level in machine state register 306, and will not execute the master key address load instruction if the privilege level is anything other than hypervisor privilege.

The hypervisor code further invalidates some or all of the cached address translation data in address translation unit 324 (step 506). Invalidation of this data is performed to prevent one partition from accessing real addresses corresponding to another partition. The type of cached address translation data invalidated depends on the architecture. For example, a translation lookaside buffer, which maps effective or virtual addresses in the processor address space (i.e. the address space of the currently executing partition) to real memory addresses, would typically be invalidated in its entirety. On the other hand, a set of registers or buffers which map real memory reserved for the hypervisor would not be invalidated.

The hypervisor may further perform additional operations needed to change the partition context of the processor core, not necessary to an understanding of the present invention. These additional operations are shown generally in FIG. 5 as step 507. Although represented as a single step, it will be understood that this could involve multiple steps, and that the steps represented by step 507 could be interspersed with various other steps of FIG. 5, and that steps 503-507 might be performed in a different order.

When the hypervisor has performed all necessary operations, it relinquishes the CPU core by invalidating the L1 caches, resetting the privilege level in machine state register 306 to an appropriate (non-hypervisor) level, and starting or restarting a task in the new partition (step 508). Generally, the first process started will be part of the OK kernel of the applicable partition, which will then dispatch one or more user tasks to the CPU core for execution.

Thus, the address in real memory of the master key for the partition is stored in master key address register 307 whenever the partition has the CPU core. However, a task executing on the CPU core can not directly access the contents of master key address register 307, there being no machine-level instruction for reading the contents of this register is such a manner as to be visible, i.e. storable in memory, general purpose registers, or other registers from which it can be tested or otherwise inferred. Master key address register 307 is only read as part of a machine level instruction which invokes crypto-engine to perform an operation on data, such as a data encryption or decryption.

Figure 6:
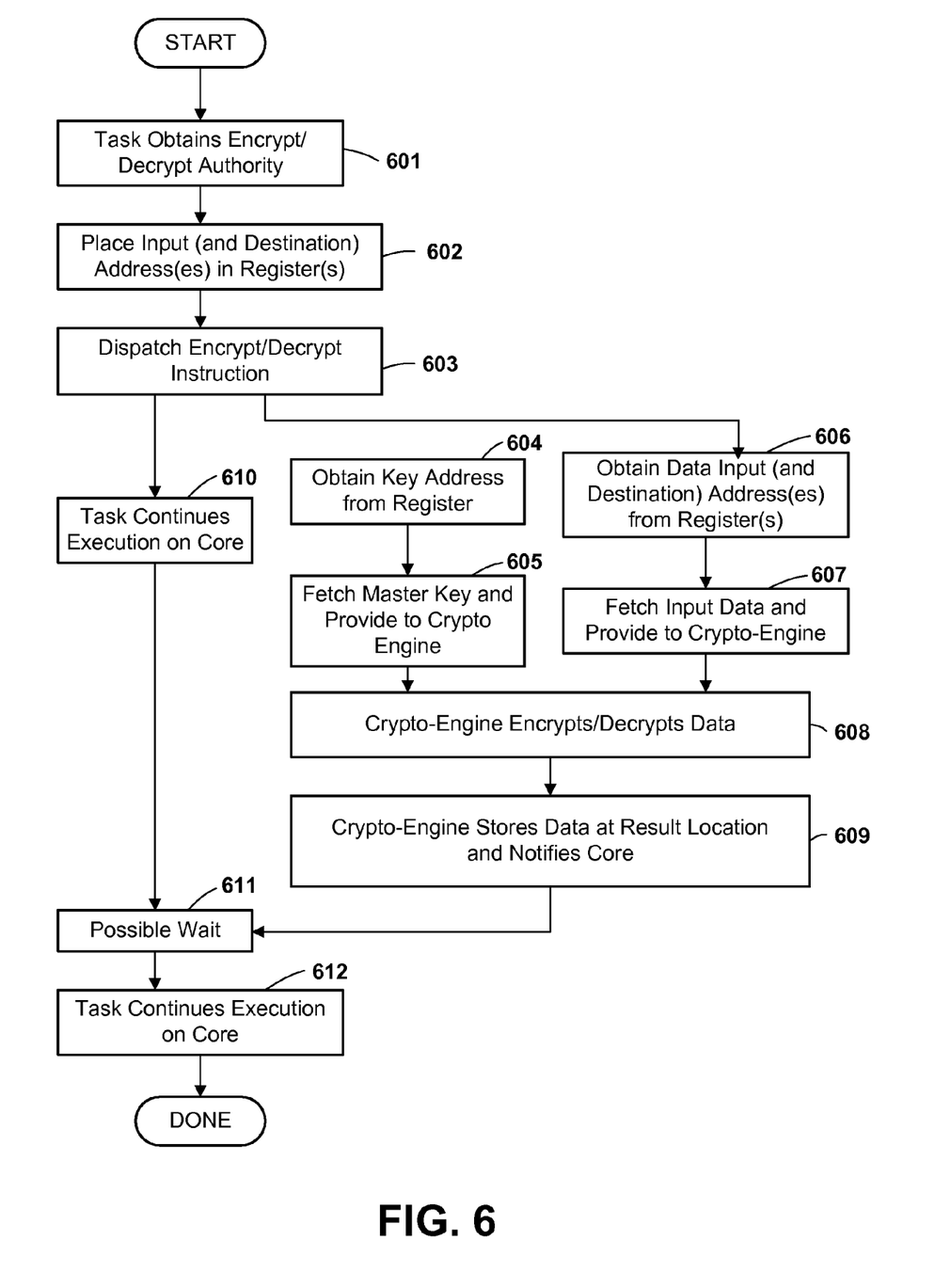
FIG. 6 is a flow diagram illustrating a process of encrypting/decrypting data on behalf of a task executing within a partition using the partition's master key, according to the preferred embodiment.

FIG. 6 is a flow diagram illustrating a process of encrypting or decrypting data on behalf of a task executing within a partition using the partition's master key, according to the preferred embodiment.

Referring to FIG. 6, the executing task obtains proper authority to execute an encryption/decryption instruction (step 601). How authority is granted is generally dependent on the design of the OS Kernel for the partition. Machine state register 306 may contain multiple bits indicating privilege or authority levels, which may be used, among other things, to provide authority to execute the encryption/decryption instruction. However, it is not necessary that the executing task have hypervisor privileges. For example, encryption/decryption might be an OS Kernel function which requires a call to the OS Kernel. Step 601 may optionally be skipped where data is being encrypted.

The effective address of the data to be encrypted/decrypted is loaded into a register or otherwise generated and placed in a register, such as one of GP registers 312, prior to executing an encryption/decryption instruction (step 602). It would alternatively be possible to load the data itself, but loading an address allows larger blocks of data to be encrypted/decrypted at one time. Optionally, a destination effective address of the resultant encrypted/decrypted data is also loaded into another register (or the destination address may be implied by any of various conventional means).

The machine level encryption/decryption instruction is then encountered and dispatched by instruction unit 301 (step 603). Dispatch of the encryption/decryption instruction invokes crypto-engine 211. Crypto-engine 211 is preferably a pipeline which may perform certain operations in parallel. As shown in FIG. 6, the master key address is obtained from register 307 (step 604). The encryption/decryption instruction either causes the master key address to be sent to the crypto-engine (e.g. as part of a secure data packet built by the processor core and sent to the crypto-engine to invoke its function), or causes the cypto-engine to retrieve the master key address from the register. In either case, responsive to obtaining the master key address, the master key is retrieved at the real address contained in the register and provided to the crypto-engine (step 605). This master key may be in L2 or L3 cache, or in main memory, but since L1 cache is addressed with effective addresses (and might therefore be accessed by a task executing within a partition), the key would not be in L1 cache. Dispatch of the encryption/decryption instruction further causes accessing the address of the input data to be encrypted/decrypted (and optional address of resultant encrypted/decrypted data) from the corresponding GP register(s) 312 (steps 606). Similarly to the master key address, the input and resultant data address might be sent to the crypto-engine as part of a secure data packet, or the crypto engine might retrieve them from registers. Responsive to accessing the input data address, the input data is provided to the crypto-engine (step 607). This data may be in the L1 D-cache, or in another cache or main memory. If it is in a lower level cache or main memory, the address must be translated using address translate unite 324 to obtain the data. When the crypto-engine has both the master key and the input data, it performs the data transformation to encrypt/decrypt the data according to the applicable encryption/decryption algorithm. (step 608). The crypto engine then stores the encrypted/decrypted data in an appropriate result location (e.g., at an address previously provided), and signals to the CPU core that the operation is complete (step 609).

Preferably, the crypto-engine operates asynchronously from the processor core. Once the processor core has dispatched the encrypt/decrypt instruction and provided the crypto-engine with any necessary input parameters, the task may continue execution in the CPU core while the encryption/decryption operation is in progress in the crypto-engine (represented as step 610). Depending on the instruction stream, the processor core may have to wait at step 611 for the crypto-engine to signal completion of the encryption/decryption operation, before continuing execution of the remaining instructions of the task (at step 612).

Although the operation performed by crypto-engine has been referred to herein as a encryption/decryption, it will be understood that a similar procedure could be used to generate digital signatures using a master key. It will further be understood that, where a private/public key algorithm is used, a secure procedure which protects the key, such as that shown in FIG. 6 and described above, is only needed for decryption, and it would be possible to encrypt data by other means.

In the preferred embodiment, master key address register 307 contains a real address of the master key for the currently executing partition. However, it will be appreciated that it would alternatively be possible to load the master key itself into a special register in the processor, and provide it directly to the crypto-engine as required. Since the key is typically larger than a real address, the register would be correspondingly larger. Furthermore, although the preferred embodiment described herein utilizes a single master key register and master key for each partition, it would alternatively be possible to provide multiple master keys for each partition and multiple master key registers for storing all of the multiple master keys.

In the preferred embodiment, a hardware crypto-engine encrypts/decrypts data by accessing a master key at a location in a special register. The use of the hardware crypto-engine improves encryption/decryption performance and provides an added level of security. However, it would alternatively be possible to perform encryption/decryption in software as a hypervisor process, in which the hypervisor is called by a task executing within a partition, and accesses the master key to encrypt/decrypt data, returning only the encrypted/decrypted data (and not the key) to the calling task in a partition. Although such an alternative would generally be slower, it would not require certain special-purpose hardware.

In the preferred embodiment, the partition manager is software (i.e., machine instructions) which executes on the same processor or processors which execute tasks within partitions, and which is isolated from the partitions by executing in real addresses to which no address in a partition address space corresponds. However, a partition manager could be implemented differently. For example, a partition manager could be implemented as instructions executing on a separate special processor for that purpose, which may or may not employ the same instruction set as the processors which execute tasks within partitions. In such an embodiment, the master keys or key references might be stored in the special processor, or in storage accessible only to it. It will also be understood that some partition manager functions could be performed in a separate special processor while others are performed in the general purpose processors which execute tasks within partitions.

As explained herein, in accordance with the preferred embodiment, the master encryption keys are "inaccessible" to tasks executing in the partitions. This inaccessibility refers to the inability of any task executing within a partition, even an OS Kernel task which normally has extra privileges, to access the memory location in which the key is stored, to read the key from a register, or to otherwise derive the key, using conventional algorithms and the system provided access mechanisms. As mentioned previously, it is theoretically possible to break any encryption code by exhaustively generating all possible key combinations, and other codebreaking techniques, beyond the scope of this disclosure, may make it possible to get at the key. Similarly, there exists the possibility that a hacker will somehow circumvent the systems addressing and partitioning protection mechanisms to access real memory locations in the hypervisor. The present invention is intended to improve security, and not to guarantee that for once and for all time data will be secure from discovery and attack.

In general, the routines executed to implement the illustrated embodiments of the invention, whether implemented as part of a partition manager, an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product embodied in a computer-readable media in any of a variety of forms, and the invention applies equally regardless of the particular type of media used. Furthermore, an a program may be distributed or downloaded to or from computer-readable media using any of various transmission technologies. Examples of computer readable media include, but are not limited to, volatile and non-volatile memory devices, floppy disks, hard-disk drives, CD-ROM's, DVD'S, magnetic tape, and so forth. Examples of computer-readable media are illustrated in FIG. 1 as memory 103, and as data storage devices 112.

Although a specific embodiment of the invention has been disclosed along with certain alternatives, it will be recognized by those skilled in the art that additional variations in form and detail may be made within the scope of the following claims.

What is claimed is:

1. A digital data processing system, comprising:
    a memory having a plurality of addressable locations for storing data;
    at least one processor, each said at least one processor for executing instructions stored at addressable locations in said memory;
    a logical partitioning facility which enforces logical partitioning of said computer system into a plurality of logical partitions, each logical partition for executing a respective set of tasks on behalf of respective one or more users on a respective at least one of said at least one processor, wherein tasks executing in each said logical partition generate effective addresses exclusively within a respective partition address space, said effective addresses being mapped to corresponding real addresses in said memory by said logical partitioning facility, wherein a first non-empty subset of real addresses in said memory are real addresses to which no effective address in any said partition address space correspond, said logical partitioning facility maintaining a respective encryption key for each of a plurality of said logical partitions at a respective real address in said first non-empty subset of real addresses in said memory, each said encryption key being inaccessible to tasks executing in the respective logical partition; and a data transformation facility shared by multiple said logical partitions which performs data transformations on behalf of at least some said tasks executing in respective said logical partitions, each data transformation on behalf of a respective task being performed by accessing a respective encryption key for the partition in which the respective task is executing and using the encryption key to perform the data transformation, said data transformation facility performing each data transformation on respective untransformed input data stored in said memory at a respective first addressable location accessible to the respective task to produce respective transformed output data, said transformed output data being stored in said memory at a respective second addressable location accessible to the respective task, without providing said respective encryption key to the respective task.

2. The digital data processing system of claim 1, wherein said data transformation facility comprises a hardware data transformation engine which receives each said respective encryption key and an untransformed version of corresponding operand data as input, and generates a transformed version of said corresponding operand data as said transformed output data using the respective encryption key.

3. The digital data processing system of claim 2,
wherein each said processor comprises a respective master key register containing one of (a) a reference to a respective encryption key of a partition currently executing in the respective processor, and (b) a respective encryption key of a partition currently executing in the respective processor; and
wherein said, master key register is used to provide the respective encryption key to said hardware data transformation engine.

4. The digital data processing system of claim 2,
wherein said digital data processing system comprises a plurality of said processors, and
wherein said hardware data transformation engine is shared by a plurality of said processors.

5. The digital data processing system of claim 1,
wherein each said processor comprises a respective master key register containing one of (a) a reference to a respective encryption key of a partition currently executing in the respective processor, and (b) a respective encryption key of a partition currently executing in the respective processor; and
wherein said logical partitioning facility maintains a respective value in each said respective master key register corresponding to a partition currently executing in the respective processor.

6. The digital data processing system of claim 5,
wherein said logical partitioning facility loads a respective value in each said respective master key register using a respective single privileged executable instruction.

7. The digital data processing system of claim 1,
wherein at least a portion of said logical partitioning facility comprises instructions executable by said at least one processor and residing at real addresses in said first non-empty subset of real addresses in said memory.

8. The digital data processing system of claim 1, wherein each said data transformation comprises one of the set consisting of: (a) an encryption of data; (b) a decryption of data, and (c) a digital signature of data.

9. A method for operating a computer system having a memory and at least one processor, the memory having a plurality of addressable locations for storing data, each said at least one processor for executing instructions stored at addressable locations in said memory, the method comprising the computer-executed steps of:
allocating resources of said computer system to a plurality of logical partitions and executing in each said logical partition a plurality of tasks on behalf of respective one or more users on a respective at least one of said at least one processor, wherein tasks executing in each said logical partition generate effective addresses exclusively within a respective partition address space, said effective addresses being mapped to corresponding real addresses in said memory, wherein a first non-empty subset of real addresses in said memory are real addresses to which no effective address in any said partition address space correspond;
maintaining in said computer system a respective encryption key for each said logical partition at a respective real address in said first non-empty subset of real addresses in said memory, said encryption keys being inaccessible to tasks executing in any said logical partition;
performing data transformations on behalf of at least some said tasks executing in respective said logical partitions, each said data transformation comprising one of the set consisting of: (a) an encryption of data; (b) a decryption of data, and (c) a digital signature of data, each data transformation on behalf of a respective task being performed using the respective encryption key for the partition in which the respective task is executing, each data transformation being performed on respective untransformed input data stored in said memory at a respective first addressable location accessible to the respective task to produce respective transformed output data; and
storing each respective transformed output data produced by said step of performing data transformations in said memory at a respective second addressable location accessible to the respective said task executing in the respective logical partition without providing said respective encryption key to the respective task.

10. The method of claim 9, wherein said step of performing data transformations on behalf of at least some tasks executing in respective logical partitions comprises invoking a hardware data transformation engine which receives each said respective encryption key and an untransformed version of corresponding operand data as input, and generates a transformed version of said corresponding operand data as said transformed output data using the respective encryption key.

11. The method of claim 10,
wherein each said processor of said computer system comprises a respective master key register containing one of (a) a reference to a respective encryption key of a partition currently executing in the respective processor, and (b) a respective encryption key of a partition currently executing in the respective processor; and
wherein said, master key register is used to provide the respective encryption key to said hardware data transformation engine.

12. The method of claim 9
wherein each said processor of said computer system comprises a respective master key register containing one of (a) a reference to a respective encryption key of a partition currently executing in the respective processor, and (b) a respective encryption key of a partition currently executing in the respective processor; and
wherein said method further comprises maintaining a respective value in each said respective master key register corresponding to a partition currently executing in the respective processor.

13. The method of claim 12,
wherein said step of maintaining a respective value in each said respective master key register comprises loading a respective value in each said respective master key register using a respective single privileged executable instruction.

14. The method of claim 9,
wherein said steps of allocating resources of said computer system to a plurality of logical partitions and maintaining in said computer system a respective encryption key for each of said logical partitions are performed by a logical partitioning facility, at least a portion of said logical partitioning facility comprising instructions executable by said at least one processor of said computer system and residing at real addresses in said first non-empty subset of real addresses in said memory.

15. A computer program product for enforcing logical partitioning of a computer system having a memory and at least one processor, the memory having a plurality of addressable locations for storing data, each said at least one processor for executing instructions stored at addressable locations in said memory, the computer program product comprising:

a plurality of instructions recorded on a non-transitory computer-readable media, the instructions storable at addressable locations of said memory and executable on said at least one processor, including:

at least one resource allocation function which allocates resources of said computer system among a plurality of logical partitions, each said logical partition containing a respective plurality of tasks executing on behalf of respective one or more respective users on a respective at least one of said at least one processor, wherein tasks executing in each said logical partition generate effective addresses exclusively within a respective partition address space, said effective addresses being mapped to corresponding real addresses in said memory, wherein a first non-empty subset of real addresses in said memory are real addresses to which no effective address in any said partition address space correspond;

an encryption key maintenance function which maintains a respective encryption key for each said logical partition at a respective real address in said first non-empty subset of real addresses in said memory, said encryption keys being inaccessible to tasks executing in any said logical partition, said encryption key maintenance function providing respective encryption keys for use in performing data transformations on behalf of at least some said tasks executing in respective said logical partitions, each data transformation on behalf of a respective task being performed using the respective master encryption key for the partition in which the respective task is executing, each said data transformation being performed on respective untransformed input data stored in said memory at a respective first addressable location accessible to the respective task to produce transformed output data, said transformed output data being stored in said memory as a respective second addressable location accessible to the respective task without providing the respective encryption key to the respective task.

16. The computer program product of claim 15,
wherein at least a portion of said computer program product comprises instructions executable by said at least one processor of said computer system and residing at real addresses in said first non-empty subset of real addresses in said memory.

17. The computer program product of claim 15,
wherein each processor of one or more processors of said computer system comprises a respective master key register for storing one of (a) a reference to a respective encryption key of a partition currently executing in the respective processor, and (b) a respective encryption key of a partition currently executing in the respective processor; and
wherein said encryption key maintenance function maintains a respective value in each said respective master key register corresponding to a partition currently executing in the respective processor.

* * * * *